(12) United States Patent
Marzorati et al.

(10) Patent No.: US 11,468,818 B1
(45) Date of Patent: Oct. 11, 2022

(54) BRIGHTNESS ADAPTATION

(71) Applicant: Kyndryl, Inc., New York, NY (US)

(72) Inventors: Mauro Marzorati, Lutz, FL (US); Paul Llamas Virgen, Zapopan (MX); Priyansh Jaiswal, Boca Raton, FL (US); Peeyush Jaiswal, Boca Raton, FL (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/668,560

(22) Filed: Feb. 10, 2022

(51) Int. Cl.
G09G 3/20 (2006.01)
G09G 5/10 (2006.01)

(52) U.S. Cl.
CPC ......... G09G 3/2007 (2013.01); G09G 3/2003 (2013.01); G09G 5/10 (2013.01); G09G 2320/0233 (2013.01); G09G 2320/0666 (2013.01); G09G 2320/0686 (2013.01); G09G 2360/144 (2013.01); G09G 2360/16 (2013.01)

(58) Field of Classification Search
CPC ...... G09G 3/2003; G09G 3/2007; G09G 5/10; G09G 2320/0666; G09G 2320/0686; G09G 2360/16
See application file for complete search history.

(56) References Cited

U.S. PATENT DOCUMENTS

| | | | |
|---|---|---|---|
| 5,589,890 A * | 12/1996 | Mancuso | H04N 5/20 348/E5.073 |
| 5,760,760 A | 6/1998 | Helms | |
| 6,762,741 B2 | 7/2004 | Weindorf | |
| 7,839,379 B1 | 11/2010 | Kerr et al. | |
| 8,363,006 B2 | 1/2013 | Kreek et al. | |
| 8,890,793 B2 | 11/2014 | Wei et al. | |
| 10,296,803 B2 * | 5/2019 | Hamada | G06V 20/63 |
| 10,909,951 B2 | 2/2021 | Longland et al. | |
| 2014/0229875 A1 | 8/2014 | Li et al. | |

(Continued)

FOREIGN PATENT DOCUMENTS

| | | |
|---|---|---|
| CA | 2325161 | 10/2001 |
| CN | 101789230 | 7/2010 |
| KR | 101146789 | 5/2012 |

OTHER PUBLICATIONS

Tomomi Imura, "Responsive UI with Luminosity Level", https://girliemac.com/blog/2014/01/12/luminosity/, Jan. 12, 2014, 9 pages.

(Continued)

*Primary Examiner* — Gene W Lee
(74) *Attorney, Agent, or Firm* — Ken Han; Andrew M. Calderon; Calderon Safran & Cole, P.C.

(57) ABSTRACT

A computer-implemented method includes: computing, by a computing device, average pixel colors of a plurality of windows of a screen of a device; normalizing, by the computing device, the average pixel colors of the screen of the device; converting, by the computing device, the normalized average pixel colors of the screen of the device to average pixel gray scale colors; creating, by the computing device, at least one adaptive filter which corresponds to at least one of the average pixel gray scale colors; and overlaying, by the computing device, the at least one adaptive filter to at least one window of the windows of the screen of the device.

20 Claims, 7 Drawing Sheets

(56) References Cited

U.S. PATENT DOCUMENTS

| | | | |
|---|---|---|---|
| 2015/0071528 A1* | 3/2015 | Marchisio | G06F 16/29 |
| | | | 382/159 |
| 2017/0080732 A1* | 3/2017 | Kasahara | B41J 2/0456 |
| 2019/0266955 A1 | 8/2019 | Kurokawa | |
| 2021/0104208 A1 | 4/2021 | Goodsitt et al. | |
| 2022/0156949 A1* | 5/2022 | Ai | G06T 5/10 |

OTHER PUBLICATIONS

Ma et al., "Automatic Brightness Control of the Handheld Device Display with Low Illumination", 2012 IEEE, 4 pages.
Pierce, Rod. "Finding Maxima and Minima using Derivatives". Math Is Fun. Retrieved Feb. 10, 2022 from http://www.mathsisfun.com/calculus/maxima-minima.html, 6 pages.

\* cited by examiner

BRIGHTNESS ADAPTATION

BACKGROUND

Aspects of the present invention relate generally to brightness adaptation and, more particularly, to adjusting pixel colors and pixel brightness based on screen viewing habits of a user.

Brightness is an attribute of visual perception in which a source appears to be radiating or reflecting light. In other words, brightness is the perception elicited by a luminance of a visual target. The perception is not linear to luminance, and relies on a context of a viewing environment. In particular, brightness follows a logarithmic curve where perceived light is a logarithmic function of measured light. Adaptation is an ability of a retina of an eye to adjust to various levels of light. Natural night vision is an ability to see under low-light conditions. In humans, rod cells are exclusively responsible for night vision as cone cells are only able to function at higher illumination levels.

SUMMARY

In a first aspect of the invention, there is a computer-implemented method including: computing, by a computing device, average pixel colors of a plurality of windows of a screen of a device; normalizing, by the computing device, the average pixel colors of the screen of the device; converting, by the computing device, the normalized average pixel colors of the screen of the device to average pixel gray scale colors; creating, by the computing device, at least one adaptive filter which corresponds to at least one of the average pixel gray scale colors; and overlaying, by the computing device, the at least one adaptive filter to at least one window of the windows of the screen of the device.

In another aspect of the invention, there is a computer program product including one or more computer readable storage media having program instructions collectively stored on the one or more computer readable storage media. The program instructions are executable to: compute average pixel colors of a plurality of windows of a screen of a device; normalize the average pixel colors of the screen of the device; convert the normalized average pixel colors of the screen of the device to average pixel gray scale colors; create at least one adaptive filter which corresponds to at least one of the average pixel gray scale colors; and overlay the at least one adaptive filter to at least one window of the windows of the screen of the device.

In another aspect of the invention, there is system including a processor, a computer readable memory, one or more computer readable storage media, and program instructions collectively stored on the one or more computer readable storage media. The program instructions are executable to: compute average pixel colors of a plurality of windows of a screen of a device; normalize the average pixel colors of the screen of the device; convert the normalized average pixel colors of the screen of the device to average pixel gray scale colors; create at least one adaptive filter which corresponds to at least one of the average pixel gray scale colors; and overlay the at least one adaptive filter to at least one window of the windows of the screen of the device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Aspects of the present invention relate generally to brightness adaptation and, more particularly, to adjusting pixel colors and pixel brightness based on screen viewing habits of a user. Brightness adaptation affects visually sensitive people and is dependent on a quantity of light people receive from displays and the comfort of the environment. For example, when there is a reduced amount of environmental light, the light from display zones is not usually dynamically adjustable. Although there are several applications that try to address this issue by enabling a "dark mode" or a "light mode" for an application, there is no solution which handles and dynamically adjusts the brightness of different applications in a same screen at a same time to increase the comfort of the user. Further, although an entire display brightness or an entire monitor backlight can be increased or reduced depending on an environment light, there is no solution which adapts the brightness of every application or window in a device depending on the comfort of the user with a light color and/or dark color.

Aspects of the invention address the above mentioned problems by tracking and analyzing screen viewing habits of a user and adjusting with respect to pixel colors and pixel brightness. In embodiments, the screen viewing habits of the user are used as an input to cognitively adjust the brightness and color of specific pixels on every single application or window on the viewing screen in order to provide a more comfortable user experience to an eye of the user. In this manner, implementations of the present invention attempt to minimize an eye strain of the user to improve a work experience of the user.

According to an aspect of the invention, there is a computer-implemented process for reducing eye stress based on a sudden change of a background light associated with a change of applications on a display, the computer-implemented method including: monitoring, for a user, brightness settings applied to a screen based on various environmental factors and an application that is presented on a display associated with the brightness settings; linking brightness of the display for each application; determining, based on a user changing the application displayed on a screen and based on the monitoring, a sudden change in the brightness will occur, wherein the determination is made by a learning model which analyzes a history of a user behavior with respect to windows of the screen of a device for a predetermined threshold associated with the sudden change in the brightness; and changing, on a pixel by pixel basis, the brightness of the application to create a gradual change to a standard application brightness. The computer-implemented process may also change the pixel brightness including calculating, in a particular region of the display, local minima and maxima of the brightness and temporarily altering some pixels to grayscale to a transition to the standard brightness. The various environmental factors of the computer-implemented process may include a time of day, background light/noise, etc.

Implementations of the present invention provide an improvement in the technical field of tracking and analyzing screen viewing habits of a user and adjusting pixel colors and pixel brightness of an application or a window. Additionally, the screen viewing habits of the user are used as an input to cognitively adjust the brightness and color of specific pixels on every single application or window on the viewing screen to provide a more comfortable user experience to minimize an eye strain of the user. Further, embodiments of the present invention transform an application or a window of a display to a different state by automatically adjusting a brightness level of the application or the window of the display.

It should be understood that, to the extent implementations of the invention collect, store, or employ personal information provided by, or obtained from, individuals (for example, screen viewing habits of a user), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
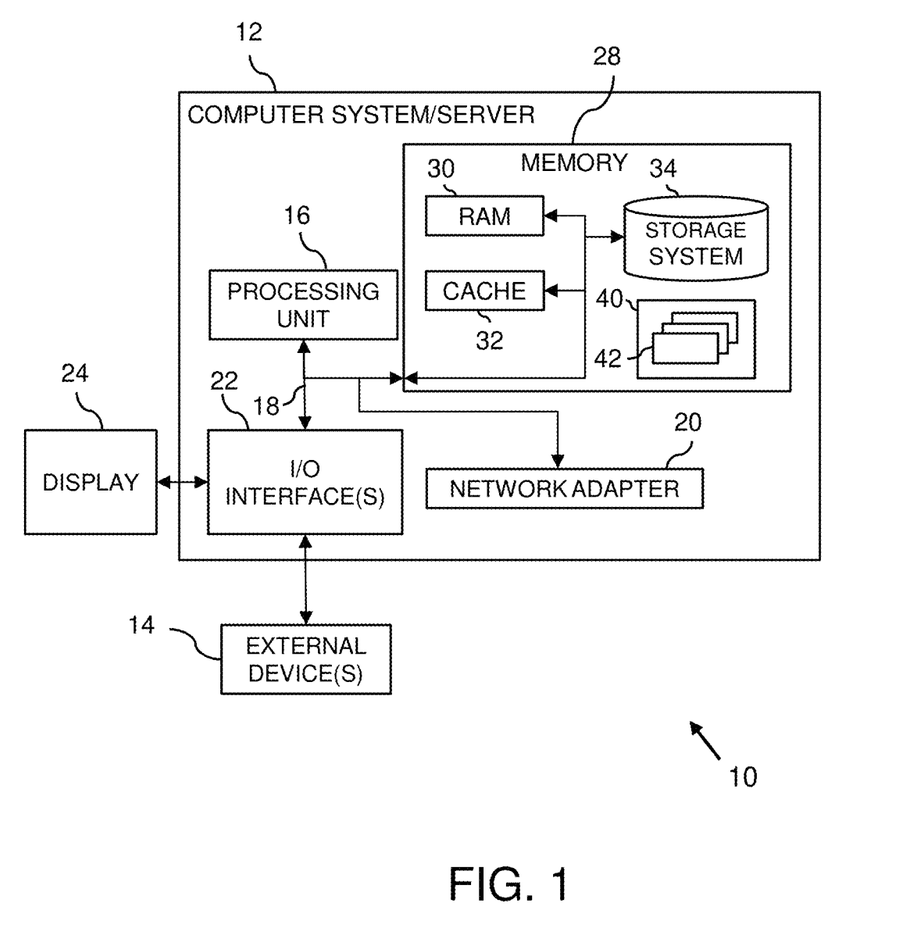
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
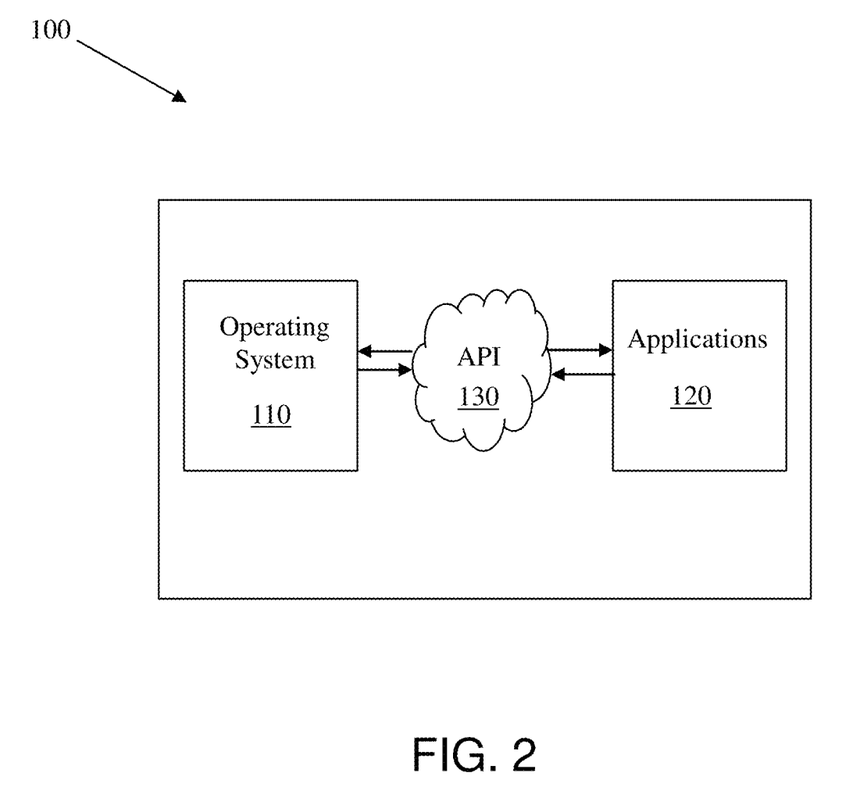
FIG. 2 shows a block diagram of an exemplary environment in accordance with aspects of the invention.

FIG. 2 shows a block diagram of an exemplary environment in accordance with aspects of the invention. In embodiments, a device 100 includes an application programming interface (API) 130 providing communication between an operating system 110 and a plurality of applications 120.

In embodiments, the device 100 comprises a computing device including the operating system 110 and the applications 120, each of which may comprise one or more program modules such as program modules 42 described with respect to FIG. 1. In an example, the device 100 comprises a computing device such as a mobile device, a monitor device, a desktop computer, a laptop computer, etc., and may comprise one or more elements of the computer system/server 12 of FIG. 1. The device 100 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, the operating system 110 is system software that communicates with the plurality of applications 120 to receive screen viewing habits of a user for each window in a screen from the applications 120, compute an average pixel color of each window in a screen and normalize the pixel color of each widow in the screen, associate the normalized pixel color to the gray scale, convert the normalized pixel color from a color scale to a gray scale, and apply the gray scale as a filter to each window in the screen of the applications 120 to adjust a brightness of each window.

In embodiments, each of the applications 120 is a software application that communicates with the operating system 110 for analyzing screen viewing habits of the user. In particular, the operating system 110 analyzes the screen viewing habits of the user for each of the applications 120. The operating system 110 applies the gray scale pixels as a filter to each window in the screen of the applications 120 to adjust a brightness of each window.

Figure 3:
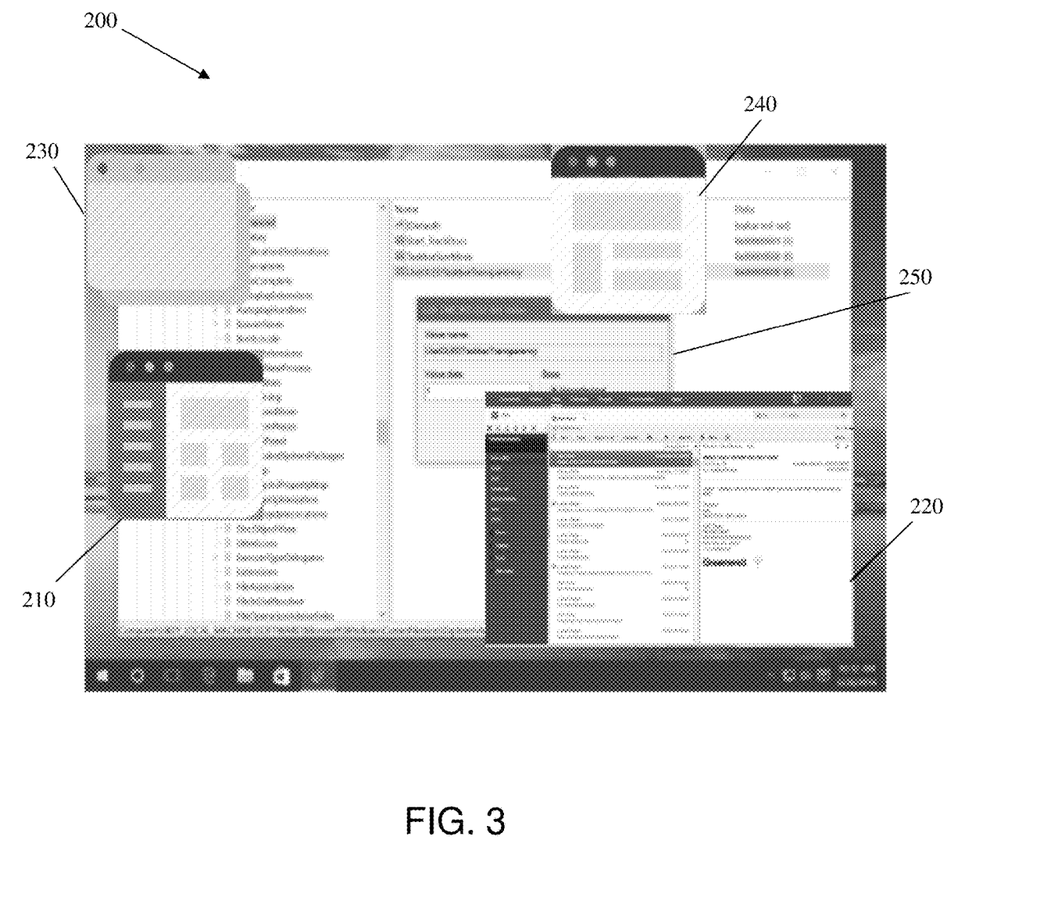
FIG. 3 shows a diagram of a light desktop mode according to an embodiment of the present invention.

FIG. 3 shows a diagram of a light desktop mode according to an embodiment of the present invention. FIG. 3 shows the light desktop mode 200 which includes light window backgrounds. However, even within the light desktop mode 200, there are windows 210 and 230 which do not have the ability to be in a light mode. For example, windows 210 and 230 may cause an uncomfortable user experience in comparison to the light mode of windows 220, 240, and 250. In particular, window 210 may only have an option for a dark mode, while window 230 does not have an option for a light mode or a dark mode.

Figure 4:
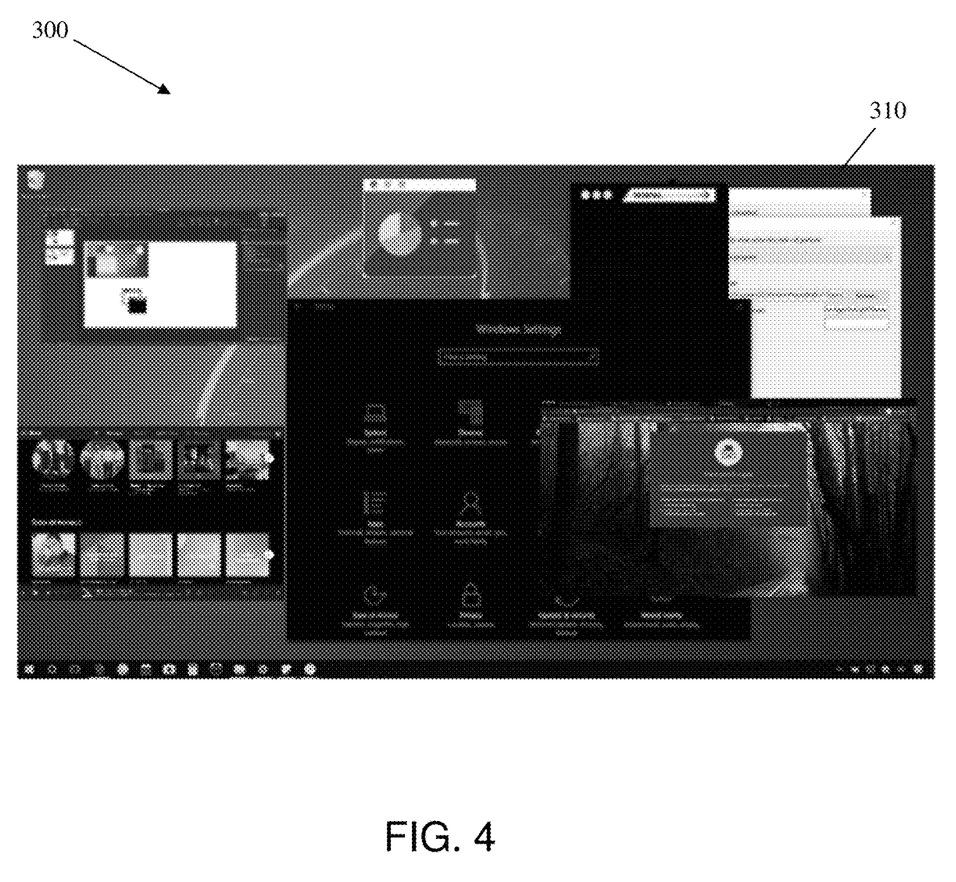
FIG. 4 shows a diagram of a dark desktop mode according to an embodiment of the present invention.

FIG. 4 shows a diagram of a dark desktop mode according to an embodiment of the present invention. FIG. 4 shows the dark desktop mode 300 which includes dark window backgrounds. However, even within the dark desktop mode 300, there is a window 310 which only has an option for a light mode. Therefore, in FIGS. 3 and 4, although the desktop mode is in a particular configuration, there may be at least one window which cannot be changed to the same desktop mode (e.g., although the screen has a dark desktop mode, at least one window is in a light mode because the at least one window doesn't support a dark mode). This configuration causes eye strain and an uncomfortable user experience.

Figure 5:
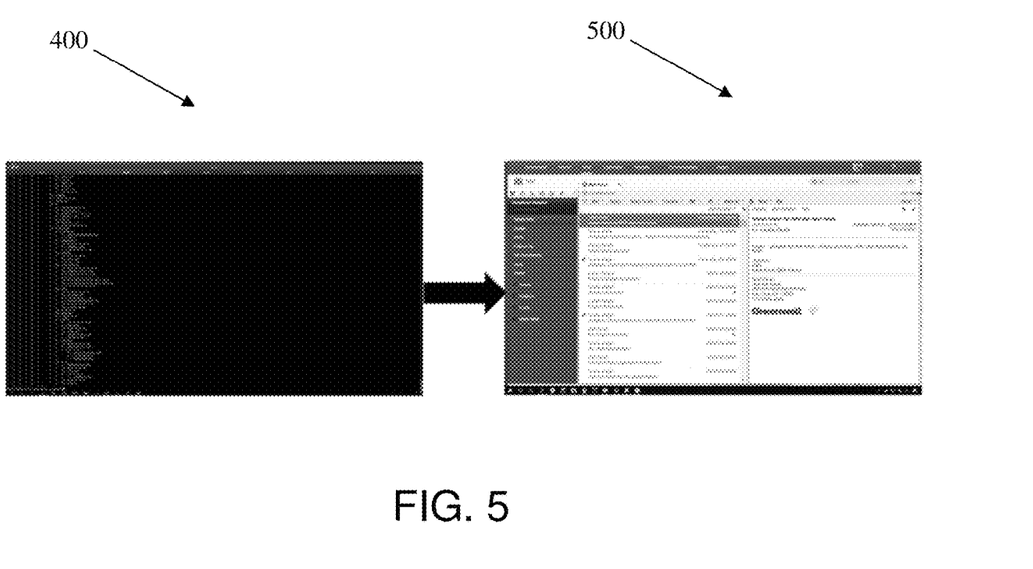
FIG. 5 shows a transition of a dark desktop mode to a light desktop mode according to an embodiment of the present invention.

As an example, FIG. 5 shows a transition of a dark desktop mode to a light desktop mode according to an embodiment of the present invention. In FIG. 5, a user is using one of the applications 120 which has a window 400 in a dark mode. Then, the user clicks on another one of the applications 120 which has a window 500 in a light mode. The abrupt transitions between the window 400 and the window 500 in the applications 120 cause eye strain and an uncomfortable user experience.

Figure 6:
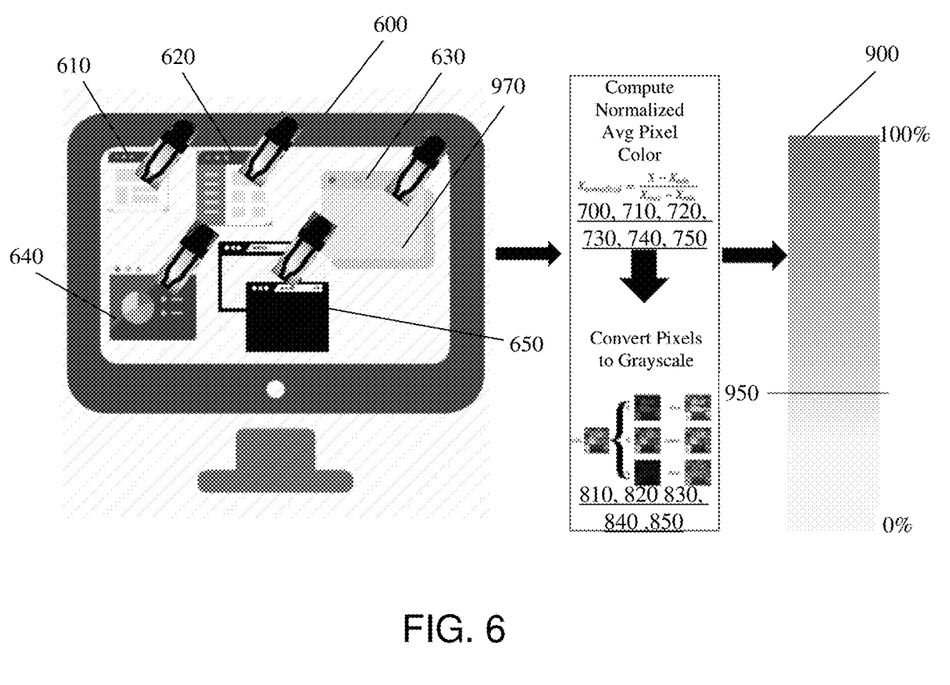
FIG. 6 shows a diagram of brightness adaptation according to an embodiment of the present invention.

FIG. 6 shows a diagram of brightness adaptation according to an embodiment of the present invention. In aspects of the present invention, a series of windows in a screen of a device 100 are analyzed to determine a normal color scheme of the user. After determining the normal color scheme of the user, the series of windows in the screen of the device 100 are transformed by applying filters to the series of windows. By applying filters to the series of windows, brightness of the series of windows is adjusted, the comfort of the user is enhanced, and eye strain of the user is reduced.

In further details of FIG. 6, the operating system 110 computes a plurality of average pixel colors 610, 620, 630, 640, and 650 which correspond with an average pixel color of each window of the screen of the device 100. The operating system 110 also computes an average pixel color 600 of all of the windows of the screen of the device 100. In FIG. 6, the average pixel color 600 points to the entire screen of the device 100 because it represents an average pixel color of the entire screen of the device 100. In particular, the operating system 110 determines coordinates of each of the windows and samples each pixel color within the determined coordinates of each of the windows to compute the average pixel colors 610, 620, 630, 640, and 650 for each window of the screen of the device 100. The operating system 110 computes the average pixel color 600 of all of the windows of the screen of the device 100 by averaging a summation of the average pixel colors 610, 620, 630, 640, and 650.

The operating system 110 then computes a plurality of normalized average pixel colors 700, 710, 720, 730, 740, and 750 using the average pixel colors 600, 610, 620, 630, 640, and 650 of each of the windows of the screen of the device 100. In particular, the normalization is calculated by applying the following formula:

$$X \text{normalized} = (X - X \min)/(X \max - X \min) \qquad \text{(Equation 1)}.$$

In Equation 1 above, X represents one of the average pixel colors 600, 610, 620, 630, 640, and 650, Xnormalized represents the normalized average pixel color 700, 710, 720, 730, 740, and 750, Xmax represents a maximum of pixel colors across all of the windows of the screen of the device 100, and Xmin represents a minimum of the pixel colors across all of the windows of the screen of the device 100.

The operating system 110 then associates the average pixel colors 600, 610, 610, 620, 630, 640, and 650 to a gray scale range 900. As shown in FIG. 6, the gray scale range 900 has a range between 100% gray scale and 0% gray scale. In embodiments, the operating system 110 associates the average pixel color 600 to the gray scale range 900 by computing an average pixel gray scale color 950 of the gray scale range 900 and anchors and normalizes the average pixel gray scale color 950 to corresponding average pixel gray scale colors 810, 820, 830, 840, and 850. In another embodiment, the step of the operating system 110 associating the average pixel colors 600, 610, 610, 620, 630, 640, and 650 to a gray scale range 900 can be included in the step of the operating system 100 converting the average pixel colors 610, 620, 630, 640, and 650 to their corresponding average pixel gray scale colors 810, 820, 830, 840, and 850.

In embodiments, the operating system 110 then converts the average pixel colors 610, 620, 630, 640, and 650 to their corresponding average pixel gray scale colors 810, 820, 830, 840, and 850. In the operating system 110, converting all of the average pixel colors 600, 610, 620, 630, 640, and 650 to the average pixel gray scale color 810, 820, 830, 840, and 850 allows for the specific pixel colors to directly impact the brightness of the filters. The operating system 110 converts all of the average pixel colors 600, 610, 620, 630, 640, and 650 to the average pixel gray scale color 810, 820, 830, 840, and 850 using the local minimum, the local maximum, the global minimum, and the global maximum to provide a differential value from which to adjust and normalize. For example, the operating system 110 converts the average pixel colors 600, 610, 620, 630, 640, and 650 to the average pixel gray scale color 810, 820, 830, 840, and 850 by associating, anchoring, adjusting, and normalizing the average pixel colors 600, 610, 610, 620, 630, 640, and 650 to the gray scale range 900. In particular, a global maximum is a maximum point across all pixel colors of all of the windows of the screen of the device 100 and a global minimum is a minimum point across all pixel colors of all of the windows of the screen of the device 100. A local maximum is a maximum point across a subset region of the pixel colors of all of the windows of the screen of the device 100. A local minimum is a minimum point across a subset region of the pixel colors of all of the windows of the screen of the device 100.

In a light mode requested by a user, the operating system 110 uses the average pixel gray scale color 810, 820, 830, 840, and 850 to cover corresponding windows on the screen of the device 100 which have a comfortability value above a predetermined threshold. In particular, the operating system 110 will use the average pixel gray scale color 810, 820, 830, 840, and 850 to create at least one adaptive filter for at least one window on a screen of the device 100. For example, if a user desires to have all windows be in the light mode, and the predetermined threshold is 70% of the gray scale range 900 (i.e., 70% gray scale range 900), in any window that has an average pixel gray scale color above 70% of the gray scale range 900, the operating system 110 overlays an adaptive filter 970 on the window to bring the comfortability value below the predetermined threshold (i.e., below 70% of the gray scale range 900). In particular, the comfortability value below the predetermined threshold results in a brightness of a window of the screen being cognitively adjusted in the light mode. In an embodiment, the predetermined threshold is set by a user. In another embodiment, the operating system 110 automatically sets the predetermined threshold based on a history of the user behavior.

In a dark mode requested by the user, the operating system 110 uses the average pixel gray scale color 810, 820, 830, 840, and 850 to cover corresponding windows on the screen of the device 100 which have the comfortability value below a predetermined threshold. In particular, the operating system 110 will use the average pixel gray scale color 810, 820, 830, 840, and 850 to create at least one adaptive filter for at least one window on a screen of the device 100. For example, if a user desires to have all windows be in the dark mode, and the predetermined threshold is 30% of the gray scale range 900 (i.e., 30% gray scale 900), in any window that has an average pixel gray scale color below 30% of the gray scale range 900, the operating system 110 will overlay the adaptive filter 970 on the window to bring the comfortability value above the predetermined threshold (i.e., above 30% of the gray scale range 900). In particular, the comfortability value above the predetermined threshold results in a brightness of a window of the screen being cognitively adjusted in the dark mode. In an embodiment, the predetermined threshold is set by a user. In another embodiment, the operating system 110 automatically sets the predetermined threshold based on a history of the user behavior.

In an embodiment, the operating system 110 performs an automated analysis of the history of the user behavior during a training period to determine the predetermined threshold of the user. For example, the operating system 110 analyzes the history of the user behavior during the training period to determine a predetermined threshold during the light mode. If the user has the comfortability value below 70% of the gray scale range 900 during the light mode, the operating system determines that the predetermined threshold should be 70% of the gray scale range 900. Therefore, the operating system 110 analyzes the average pixel colors 600, 610, 620, 630, 640, and 650 during the history of the user behavior to determine what the predetermined threshold should be in the light mode to provide comfort to the user and reduce eye strain. In other words, the operating system 110 analyzes usage patterns of the average pixels of windows on the screen of the device 100 in the light mode to determine the predetermined threshold which would provide the user with comfort and reduced eye strain.

In another example, the operating system 110 analyzes the history of the user behavior during the training period to determine a predetermined threshold during the dark mode. If the user has the comfortability level above 30% of the gray scale range 900 during the dark mode, the operating system will determine that the predetermined threshold should be 30% of the gray scale range 900. Therefore, the operating system 110 analyzes the average pixel colors 600, 610, 620, 630, 640, and 650 during the history of the user behavior to determine what predetermined threshold should be used in the dark mode to provide comfort to the user and reduce eye strain. In other words, the operating system 110 analyzes usage patterns of the average pixels of windows on the screen of the device 100 in the dark mode to determine the predetermined threshold which would provide the user with comfort and reduced eye strain.

Accordingly, in embodiments, the operating system 110 automatically determines the predetermined threshold by analyzing the history of the user and adjusts the adaptive filters to be overlaid on the corresponding windows of the screen to bring the comfortability value to an amount (i.e., by bring the comfortability value either above or below the predetermined threshold) that will provide comfort to the user and reduce eye strain. In particular, the comfortability value results in a brightness of a window of the screen being cognitively adjusted. In an embodiment, if the operating system 110 cannot analyze the history of the user behavior (i.e., there is no user history), the operating system 110 provides a graphical user interface (GUI) to manually set a predetermined threshold. In another example, at least one of the applications 120 provides the GUI to manually set the predetermined threshold.

Although FIG. 6 is described with respect to windows on a screen of a device 100, embodiments are not limited. In another example, the operating system 110 performs the same steps for the applications 120 on the screen of the device 100 instead of the windows. In other words, an adaptive filter is applied to an entire application of the applications 120 instead of just a window within a desktop. Further, although 30% and 70% have been used as predetermined thresholds, any value between a range of 0% and 100% can be used as a predetermined threshold.

Figure 7:
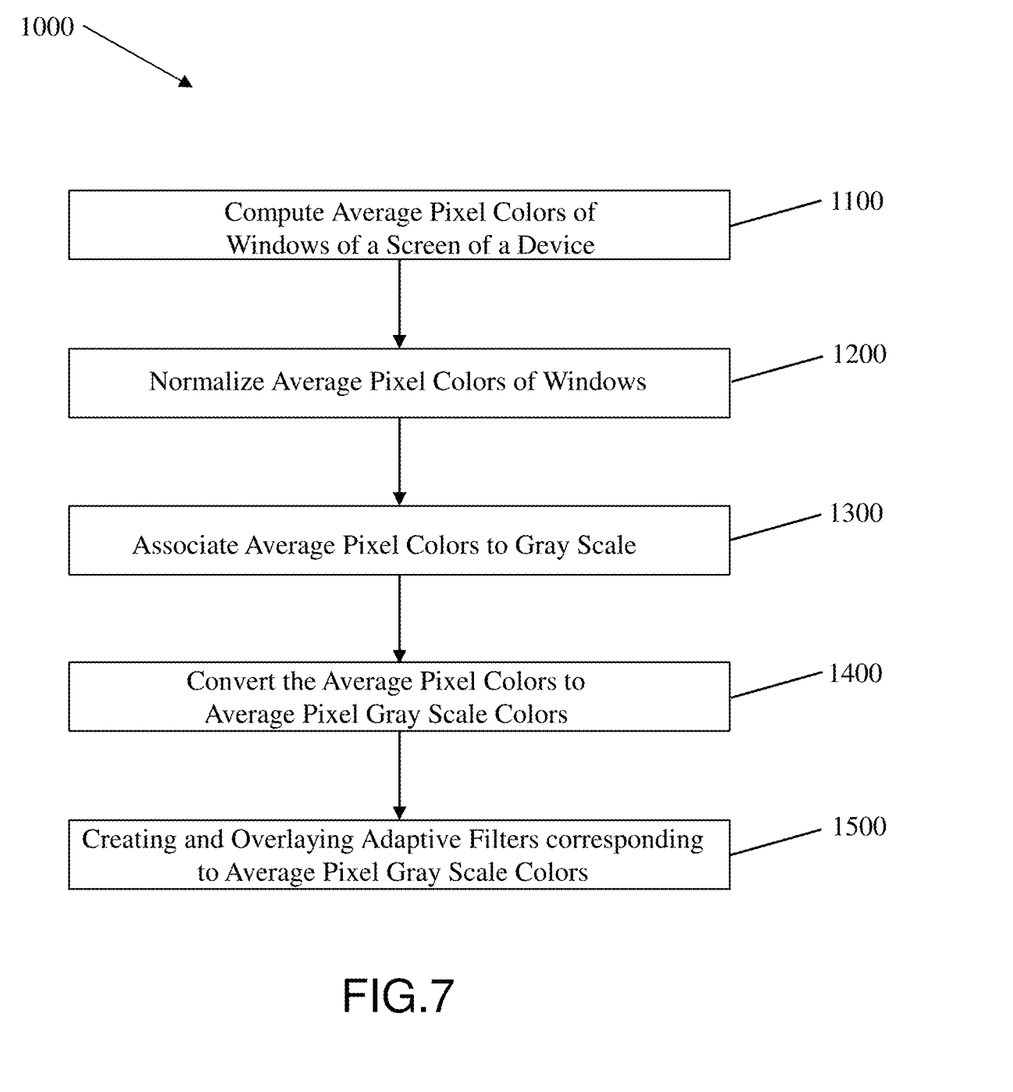
FIG. 7 shows a flowchart of an exemplary method of the brightness adaptation in accordance with aspects of the invention.

FIG. 7 shows a flowchart 1000 of an exemplary method in accordance with aspects of the present invention. Steps of the method may be carried out in the environment of FIGS. 2 and 6 and are described with reference to elements depicted in FIGS. 2 and 6.

At step 1100, the operating system 110 computes a plurality of average pixel colors which correspond with an average pixel color of each window of the screen of the device 100. For example, as shown in FIG. 6, the operating system 110 computes a plurality of average pixel colors 610, 620, 630, 640, and 650 which correspond with an average pixel color of each window of the screen of the device 100. The operating system 110 also computes an average pixel color 600 of all of the windows of the screen of the device 100. In particular, the operating system 110 determines coordinates of each of the windows and samples each pixel color within the determined coordinates of each of the windows to compute the average pixel colors 610, 620, 630, 640, and 650 for each window of the screen of the device 100. The operating system 110 also computes the average pixel color 600 of all of the windows of the screen of the device 100 by averaging a summation of the average pixel colors 610, 620, 630, 640, and 650.

At step 1200, the operating system 110 computes a plurality of normalized average pixel colors using the average pixel colors of each of the windows of the screen of the device 100. For example, as shown in FIG. 6, the operating system 110 computes a plurality of normalized average pixel colors 700, 710, 720, 730, 740, and 750 using the average pixel colors 600, 610, 620, 630, 640, and 650. In particular, the normalization is calculated by applying the formula in Equation 1 described with respect to FIG. 6.

At step 1300, the operating system 110 associates the average pixel colors to a gray scale range 900. For example, as shown in FIG. 6, the operating system 110 associates the average pixel colors 600, 610, 620, 630, 640, and 650 to a gray scale range 900. As shown in FIG. 6, the gray scale range 900 has a range between 100% gray scale and 0% gray scale. The operating system 110 associates the average pixel color 600 to the gray scale range 900 by computing an average pixel gray scale color 950 of the gray scale range 900 and anchors and normalizes the average pixel gray scale color 950 to the corresponding average pixel gray scale colors 810, 820, 830, 840, and 850. In another embodiment, the step 1300 of the operating system 110 associating the average pixel colors 600, 610, 610, 620, 630, 640, and 650 to a gray scale range 900 can be included in the step 1400 of the operating system 100 converting the average pixel colors 610, 620, 630, 640, and 650 to their corresponding average pixel gray scale colors 810, 820, 830, 840, and 850.

At step 1400, the operating system 110 converts the average pixel colors to their corresponding average pixel gray scale color. For example, as shown in FIG. 6, the operating system 110 converts the average pixel colors 610, 620, 630, 640, and 650 to their corresponding average pixel gray scale color 810, 820, 830, 840, and 850. In the operating system 110, converting all of the average pixel colors 600, 610, 620, 630, 640, and 650 to the average pixel gray scale colors 950, 810, 820, 830, 840, and 850 allows for the specific pixel colors to directly impact the brightness of the filters. The operating system 110 converts of all of the average pixel colors 600, 610, 620, 630, 640, and 650 to the average pixel gray scale color 950, 810, 820, 830, 840, and 850 using the local minimum, the local maximum, the global minimum, and the global maximum to provide a differential value from which to adjust and normalize. For example, the operating system 110 converts the average pixel colors 600, 610, 620, 630, 640, and 650 to the average pixel gray scale colors 950, 810, 820, 830, 840, and 850 by associating, anchoring, adjusting, and normalizing the average pixel colors 600, 610, 620, 630, 640, and 650 to the gray scale range 900. In particular, a global maximum is a maximum point across all pixel colors of all of the windows of the screen of the device 100 and a global minimum is a minimum point across all pixel colors of all of the windows of the screen of the device 100. A local maximum is a maximum point across a subset region of the pixel colors of all of the windows of the screen of the device 100. A local minimum is a minimum point across a subset region of the pixel colors of all of the windows of the screen of the device 100.

At step 1500, the operating system 110 creates adaptive filters (e.g., an adaptive filter 970) corresponding to the average pixel gray scale colors and overlays the adaptive filters on the windows. For example, as shown in FIG. 6, the operating system 110 creates adaptive filters (e.g., an adaptive filter 970) corresponding to the average pixel gray scale colors 810, 820, 830, 840, and 850 and overlays the adaptive filters on the windows. In an example, as shown in FIG. 6, the adaptive filter 970 is overlaid on a window on the screen of the device 100.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
computing, by a computing device, average pixel colors of a plurality of windows of a screen of a device;
normalizing, by the computing device, the average pixel colors of the screen of the device;
converting, by the computing device, the normalized average pixel colors of the screen of the device to average pixel gray scale tones;
creating, by the computing device, at least one adaptive filter which corresponds to at least one of the average pixel gray scale tones; and
overlaying, by the computing device, the at least one adaptive filter to at least one window of the windows of the screen of the device.

2. The method of claim 1, wherein the computing the average pixel colors of the windows of the screen of the device comprises:
determining coordinates of each of the windows of the screen of the device; and
sampling each pixel color within the determined coordinates of each of the windows such that the average pixel colors of the windows of the screen of the device is computed.

3. The method of claim 2, wherein the computing the average pixel colors of the windows of the screen of the device further comprises averaging a summation of the average pixel colors of the windows of the screen of the device.

4. The method of claim 1, wherein the normalizing the average pixel colors of the screen of the device is based on a maximum of pixel colors across the windows of the screen of the device and a minimum of pixel colors across the windows of the screen of the device.

5. The method of claim 1, wherein the converting the average pixel colors of the screen of the device to the average pixel gray scale tones is based on a local minimum of the average pixel colors, a local maximum of the average pixel colors, a global minimum of the average pixel colors, and a global maximum of the average pixel colors.

6. The method of claim 1, further comprising associating, by the computing device, the average pixel colors of the screen of the device to a gray scale range.

7. The method of claim 6, wherein the gray scale range is between a 0% gray scale and a 100% gray scale.

8. The method of claim 1, wherein the at least one adaptive filter overlaid on the at least one window of the screen of the device brings a comfortability value below a predetermined threshold in a light mode, and the comfortability value below the predetermined threshold results in a brightness of the at least one window of the screen being cognitively adjusted in the light mode.

9. The method of claim 8, further comprising determining, by the computing device, the predetermined threshold by analyzing a history of a user behavior in the light mode using a learning model.

10. The method of claim 1, wherein the at least one adaptive filter overlaid on the at least one widow of the screen of the device brings a comfortability value above a predetermined threshold in a dark mode, and the comfortability value above the predetermined threshold results in a brightness of the at least one window of the screen being cognitively adjusted in the dark mode.

11. The method of claim 10, further comprising determining, by the computing device, the predetermined threshold by analyzing a history of a user behavior in the dark mode using a learning model.

12. A computer program product comprising one or more computer readable storage media having program instructions collectively stored on the one or more computer readable storage media, the program instructions executable to:
compute average pixel colors of a plurality of windows of a screen of a device;
normalize the average pixel colors of the screen of the device;
convert the normalized average pixel colors of the screen of the device to average pixel gray scale tones;
create at least one adaptive filter which corresponds to at least one of the average pixel gray scale tones; and
overlay, by the computing device, the at least one adaptive filter to at least one window of the windows of the screen of the device.

13. The computer program product of claim 12, wherein the program instructions are further executable to associate the average pixel colors of the screen of the device to a gray scale range.

14. The computer program product of claim 12, wherein the program instructions are further executable to determine a predetermined threshold by analyzing a history of a user behavior in a light mode using a learning model.

15. The computer program product of claim 14, wherein the at least one adaptive filter overlaid on the at least one window of the screen of the device brings a comfortability value below the predetermined threshold in the light mode, and the comfortability value below the predetermined threshold results in a brightness of the at least one window of the screen being cognitively adjusted in the light mode.

16. The computer program product of claim 12, wherein the program instructions are further executable to determine a predetermined threshold by analyzing a history of a user behavior in a dark mode using a learning model.

17. The computer program product of claim 16, wherein the at least one adaptive filter overlaid on the at least one widow of the screen of the device brings a comfortability value above the predetermined threshold in the dark mode, and the comfortability value above the predetermined threshold results in a brightness of the at least one window of the screen being cognitively adjusted in the dark mode.

18. A system comprising:
a processor, a computer readable memory, one or more computer readable storage media, and program instructions collectively stored on the one or more computer readable storage media, the program instructions executable to:
compute average pixel colors of a plurality of windows of a screen of a device;
normalize the average pixel colors of the screen of the device;
convert the normalized average pixel colors of the screen of the device to average pixel gray scale tones;
create at least one adaptive filter which corresponds to at least one of the average pixel gray scale tones; and
overlay, by the computing device, the at least one adaptive filter to at least one window of the windows of the screen of the device.

19. The system of claim 18, wherein the program instructions are further executable to determine a predetermined threshold by analyzing a history of a user behavior with respect to the windows of the screen of the device using a learning model.

20. The system of claim 19, wherein the at least one adaptive filter overlaid on the at least one widow of the screen of the device changes a comfortability value of at least one window of the windows of the screen of the device based on the predetermined threshold, and the comfortability value results in a brightness of the at least one window of the windows of the screen being cognitively adjusted.

\* \* \* \* \*